(12) United States Patent
Aston et al.

(10) Patent No.: US 12,227,314 B2
(45) Date of Patent: Feb. 18, 2025

(54) MULTIPLE SPACE VEHICLE LAUNCH SYSTEM

(71) Applicant: The Boeing Company, Chicago, IL (US)

(72) Inventors: Richard W. Aston, Brea, CA (US); Anna M. Tomzynska, Seal Beach, CA (US); Glenn N. Caplin, Manhattan Beach, CA (US)

(73) Assignee: The Boeing Company, Arlington, VA (US)

( * ) Notice: Subject to any disclaimer, the term of this patent is extended or adjusted under 35 U.S.C. 154(b) by 52 days.

(21) Appl. No.: 17/570,677

(22) Filed: Jan. 7, 2022

(65) Prior Publication Data

US 2022/0127022 A1 Apr. 28, 2022

Related U.S. Application Data

(63) Continuation of application No. 15/920,284, filed on Mar. 13, 2018, now Pat. No. 11,286,066, which is a
(Continued)

(51) Int. Cl.
*B64G 1/64* (2006.01)
*B64G 1/00* (2006.01)
*B64G 1/40* (2006.01)

(52) U.S. Cl.
CPC .............. *B64G 1/641* (2013.01); *B64G 1/002* (2013.01); *B64G 1/40* (2013.01); *B64G 1/405* (2013.01); *B64G 1/645* (2013.01)

(58) Field of Classification Search
CPC ........ B64G 1/641; B64G 1/002; B64G 1/402; B64G 1/645; B64G 1/44; B64G 1/401;
(Continued)

(56) References Cited

U.S. PATENT DOCUMENTS 3,145,531 A * 8/1964 Deutsch ................... B64G 1/26
244/171.2
3,420,470 A * 1/1969 Meyer ................... B64G 1/645
102/378
(Continued)

FOREIGN PATENT DOCUMENTS

CN 1131291 9/1996
CN 1172751 2/1998
(Continued)

OTHER PUBLICATIONS

State Intellectual Property Office of China, "First Office Action and Search Report", issued in connection with Chinese Patent Application No. 2018104861031, dated Dec. 17, 2020, (15 pages).
(Continued)

*Primary Examiner* — Medhat Badawi
(74) *Attorney, Agent, or Firm* — Hanley, Flight & Zimmerman, LLC (57) ABSTRACT

A space vehicle system, a method of manufacturing a multiple space vehicle system, and a method of disposing space vehicles into Earth orbit are disclosed. The space vehicle system may include a first space vehicle including a first core structure with a first wall thickness. The space vehicle system may include a second space vehicle including a second core structure with a second wall thickness, the second wall thickness different from the first wall thickness, and the second core structure releasably attached to the first space vehicle in a stacked configuration.

29 Claims, 3 Drawing Sheets

Related U.S. Application Data continuation of application No. 14/925,152, filed on Oct. 28, 2015, now Pat. No. 9,957,068, which is a continuation of application No. 14/486,103, filed on Sep. 15, 2014, now Pat. No. 9,394,065, which is a continuation of application No. 13/604,050, filed on Sep. 5, 2012, now Pat. No. 8,915,472.

(60) Provisional application No. 61/646,222, filed on May 11, 2012.

(58) Field of Classification Search
CPC ... B64G 1/14; B64G 1/66; B64G 1/26; B64G 1/22; B64G 2001/643; B64G 1/40; B64G 1/405; B64G 1/242; B64G 1/1085
See application file for complete search history.

(56) References Cited

U.S. PATENT DOCUMENTS

| | | | | |
|---|---|---|---|---|
| 3,929,306 A * | 12/1975 | Faget | B64G 1/402 | 244/172.3 |
| 4,009,851 A * | 3/1977 | Cable | B64G 1/10 | 244/173.1 |
| 4,345,861 A * | 8/1982 | Aarseth | B63B 25/16 | 105/361 |
| 4,682,744 A * | 7/1987 | Gounder | B64G 1/10 | 244/133 |
| 4,829,784 A * | 5/1989 | Berg | F25B 23/003 | 62/7 |
| 4,896,848 A * | 1/1990 | Ballard | B64G 1/401 | 244/171.3 |
| 5,052,640 A * | 10/1991 | Chang | B64G 1/002 | 244/172.7 |
| 5,152,482 A * | 10/1992 | Perkins | B64G 1/641 | 244/159.4 |
| 5,199,672 A * | 4/1993 | King | B64G 1/645 | 244/164 |
| 5,271,582 A * | 12/1993 | Perkins | B64G 1/641 | 244/159.4 |
| 5,314,146 A * | 5/1994 | Chicoine | B64G 1/10 | 244/159.4 |
| 5,350,137 A * | 9/1994 | Henley | B64G 1/1085 | 244/63 |
| 5,351,746 A * | 10/1994 | Mackey | B64G 1/503 | 165/41 |
| 5,383,631 A * | 1/1995 | Mazzini | B64G 1/405 | 244/164 |
| 5,386,953 A * | 2/1995 | Stuart | B64G 1/1021 | 244/158.4 |
| 5,397,082 A * | 3/1995 | Scott | B64G 1/105 | 244/171.3 |
| 5,411,226 A * | 5/1995 | Jones | B64G 1/641 | 244/173.3 |
| 5,522,569 A * | 6/1996 | Steffy | B64G 1/222 | 244/172.6 |
| 5,527,001 A * | 6/1996 | Stuart | H04B 7/2041 | 244/172.6 |
| 5,529,264 A * | 6/1996 | Bedegrew | B64G 1/641 | 102/378 |
| 5,595,360 A * | 1/1997 | Spitzer | B64G 1/405 | 244/171.5 |
| 5,604,430 A * | 2/1997 | Decker | G05F 1/67 | 323/275 |
| 5,605,308 A * | 2/1997 | Quan | B64G 1/641 | 244/137.1 |
| 5,613,653 A * | 3/1997 | Bombled | B64G 1/641 | 244/173.1 |
| 5,641,135 A * | 6/1997 | Stuart | B64G 1/1085 | 244/172.6 |
| 5,647,561 A * | 7/1997 | Robinson | B64G 1/641 | 244/173.1 |
| 5,716,029 A * | 2/1998 | Spitzer | B64G 1/405 | 244/171.5 |
| 5,743,492 A * | 4/1998 | Chan | B64G 1/401 | 102/378 |
| 5,755,406 A * | 5/1998 | Aston | B64G 1/22 | 244/159.4 |
| 5,765,780 A * | 6/1998 | Barskey | B64G 1/28 | 244/164 |
| 5,765,784 A * | 6/1998 | Lapins | B64G 1/105 | 244/63 |
| 5,779,195 A * | 7/1998 | Basuthakur | B64G 1/1085 | 244/173.1 |
| 5,806,800 A * | 9/1998 | Caplin | B64G 1/503 | 165/41 |
| 5,823,476 A * | 10/1998 | Caplin | B64G 1/503 | 165/274 |
| 5,833,175 A * | 11/1998 | Caplin | B64G 1/10 | 244/172.7 |
| 5,848,767 A * | 12/1998 | Cappa | B64G 1/22 | 244/158.1 |
| 5,884,866 A * | 3/1999 | Steinmeyer | B64G 1/222 | 244/137.1 |
| 5,947,421 A * | 9/1999 | Beattie | B64G 1/405 | 244/171.1 |
| 5,961,738 A * | 10/1999 | Benton | H02S 30/20 | 136/251 |
| 5,976,833 A * | 11/1999 | Furukawa | C12N 9/0071 | 435/243 |
| 5,979,833 A * | 11/1999 | Eller | B64G 1/503 | 244/159.4 |
| 5,984,235 A * | 11/1999 | Snowhook | B64G 1/641 | 244/171.3 |
| 5,984,236 A * | 11/1999 | Keitel | B64G 1/26 | 244/164 |
| 6,032,904 A * | 3/2000 | Hosick | B64G 1/405 | 244/169 |
| 6,061,562 A * | 5/2000 | Martin | H01Q 21/29 | 455/431 |
| 6,121,569 A * | 9/2000 | Miley | F03H 1/00 | 219/121.36 |
| 6,135,394 A * | 10/2000 | Kamel | B64G 1/242 | 244/171.1 |
| 6,138,951 A * | 10/2000 | Budris | B64G 1/645 | 102/393 |
| 6,193,187 B1 * | 2/2001 | Scott | F02K 7/10 | 244/171.1 |
| 6,193,193 B1 * | 2/2001 | Soranno | B64G 1/007 | 244/159.4 |
| 6,206,327 B1 * | 3/2001 | Benedetti | B64G 1/10 | 244/159.4 |
| 6,227,493 B1 * | 5/2001 | Holemans | B64G 1/641 | 285/82 |
| 6,237,876 B1 * | 5/2001 | Barker | B64G 1/242 | 244/171.1 |
| 6,260,805 B1 * | 7/2001 | Yocum, Jr. | B64G 1/244 | 244/164 |
| 6,267,330 B1 * | 7/2001 | Cochran | B64G 1/402 | 244/172.2 |
| 6,296,206 B1 * | 10/2001 | Chamness | B64G 1/00 | 244/173.3 |
| 6,341,749 B1 * | 1/2002 | Ocampo | B64G 1/242 | 701/13 |
| 6,343,770 B2 * | 2/2002 | Holemans | B64G 1/641 | 285/82 |
| 6,357,698 B1 * | 3/2002 | DiVerde | B64G 1/002 | 244/173.3 |
| 6,357,699 B1 * | 3/2002 | Edberg | B64G 1/645 | 102/377 |
| 6,390,416 B2 * | 5/2002 | Holemans | B64G 1/641 | 244/173.3 |
| 6,402,091 B1 * | 6/2002 | Hansen | B64G 1/401 | 239/265.35 |
| 6,454,214 B1 * | 9/2002 | Smith | B64G 1/641 | 102/377 |
| 6,494,406 B1 * | 12/2002 | Fukushima | B64G 1/645 | 244/173.3 |

(56) References Cited

U.S. PATENT DOCUMENTS

| | | | |
|---|---|---|---|
| 6,536,712 B1* | 3/2003 | Barenett | B64G 1/222 244/158.3 |
| 6,543,723 B1* | 4/2003 | Oh | B64G 1/007 244/171.5 |
| 6,543,724 B1* | 4/2003 | Barnett | B64G 1/222 244/172.6 |
| 6,565,043 B1* | 5/2003 | Wittmann | B64G 1/242 244/169 |
| 6,581,880 B2 | 6/2003 | Randolph et al. | |
| 6,637,701 B1* | 10/2003 | Glogowski | B64G 1/242 244/164 |
| 6,739,555 B2* | 5/2004 | Mazanek | B64G 1/402 244/172.4 |
| 6,789,767 B2 | 9/2004 | Mueller et al. | |
| 6,845,950 B1* | 1/2005 | Goodzeit | B64G 1/007 701/13 |
| 7,059,571 B2 | 6/2006 | Kellberg | |
| 7,109,748 B1* | 9/2006 | Liu | H03K 19/0016 365/182 |
| 7,113,851 B1* | 9/2006 | Gelon | B64G 1/242 701/4 |
| 7,114,683 B2* | 10/2006 | Hall | B64G 1/002 244/173.1 |
| 7,138,960 B2* | 11/2006 | Carroll | H01Q 1/288 343/915 |
| 7,216,833 B2* | 5/2007 | D'Ausilio | B64G 1/1078 244/171.1 |
| 7,216,834 B2* | 5/2007 | D'Ausilio | B64G 1/422 244/172.5 |
| 7,219,858 B2* | 5/2007 | Sharer | B64G 1/242 244/158.6 |
| 7,388,559 B1* | 6/2008 | Kim | H01Q 19/134 343/912 |
| 7,400,096 B1* | 7/2008 | Foster | H01J 27/18 315/111.41 |
| 7,493,869 B1* | 2/2009 | Foster | H01J 27/18 118/723 MA |
| 7,578,482 B2* | 8/2009 | Duden | B64G 1/002 428/305.5 |
| 7,658,414 B2* | 2/2010 | Watanabe | B60K 15/03 280/834 |
| 7,686,255 B2 | 3/2010 | Harris | |
| 7,823,837 B2 | 11/2010 | Behrens et al. | |
| 7,832,687 B1 | 11/2010 | Das et al. | |
| 7,861,975 B2 | 1/2011 | Behrens et al. | |
| 7,905,453 B2 | 3/2011 | Benedict et al. | |
| 7,931,237 B2* | 4/2011 | Penzo | F42B 12/72 244/173.1 |
| 8,006,938 B2 | 8/2011 | Behrens et al. | |
| 8,016,240 B2* | 9/2011 | Caplin | B64G 1/242 455/12.1 |
| 8,136,765 B2* | 3/2012 | Geneste | B64G 1/641 244/171.3 |
| 8,152,108 B2* | 4/2012 | Becker-Irvin | B64G 1/425 244/172.7 |
| 8,196,868 B2* | 6/2012 | Kutter | F17C 3/04 244/172.3 |
| 8,281,697 B2 | 10/2012 | McCants, Jr. | |
| 8,393,582 B1* | 3/2013 | Kutter | B64G 1/641 244/172.3 |
| 8,499,874 B2* | 8/2013 | Dewis | B60K 6/12 180/65.265 |
| 8,511,617 B2* | 8/2013 | Caplin | B64G 1/1085 244/173.1 |
| 8,789,797 B2 | 7/2014 | Darooka | |
| 8,915,472 B2* | 12/2014 | Aston | B64G 1/645 244/171.1 |
| 8,973,873 B2 | 3/2015 | Aston et al. | |
| 9,027,889 B2* | 5/2015 | Aston | B64G 1/402 244/173.1 |
| 9,108,748 B2 | 8/2015 | Munir et al. | |
| 9,108,749 B2 | 8/2015 | Woo et al. | |
| 9,180,984 B2* | 11/2015 | Peterka, III | B64G 1/402 |
| 9,394,065 B2* | 7/2016 | Aston | B64G 1/645 |
| 9,643,739 B2* | 5/2017 | Peterka, III | B64G 1/405 |
| 10,351,268 B2* | 7/2019 | Estevez | B64G 1/1085 |
| 10,370,126 B1* | 8/2019 | Harvey | B64G 1/222 |
| 10,442,557 B2* | 10/2019 | Faye | B64G 1/10 |
| 10,543,938 B2* | 1/2020 | Peterka, III | B64G 1/26 |
| 10,689,132 B2* | 6/2020 | Peterka, III | B64G 1/242 |
| 10,689,133 B2* | 6/2020 | Cheynet de Beaupre | B64G 1/1021 |
| 11,286,066 B2 | 3/2022 | Aston et al. | |
| 11,708,181 B2 | 7/2023 | Peterka, III et al. | |
| 2002/0000495 A1* | 1/2002 | Diverde | B64G 1/641 244/137.1 |
| 2002/0102130 A1* | 8/2002 | Nygren | F16B 5/0208 403/337 |
| 2002/0179775 A1* | 12/2002 | Turner | B64G 1/402 244/172.5 |
| 2002/0179776 A1* | 12/2002 | Mueller | B64G 1/1085 244/158.5 |
| 2003/0075645 A1* | 4/2003 | Randolph | B64G 1/242 244/169 |
| 2003/0136881 A1* | 7/2003 | Beyer | B64G 1/641 244/158.1 |
| 2003/0150958 A1* | 8/2003 | Herbert | B64G 1/10 244/159.4 |
| 2004/0164205 A1* | 8/2004 | Kellberg | B64G 1/405 244/171.1 |
| 2005/0109878 A1* | 5/2005 | Cruijssen | B64G 1/002 244/173.1 |
| 2006/0016934 A1* | 1/2006 | Sharer | B64G 1/007 244/158.4 |
| 2006/0168936 A1* | 8/2006 | Rooney | B64G 1/405 60/202 |
| 2006/0278765 A1* | 12/2006 | Strack | B64G 1/646 244/172.4 |
| 2007/0023579 A1* | 2/2007 | Wang | G01C 21/02 244/158.6 |
| 2007/0029446 A1* | 2/2007 | Mosher | B64G 1/10 244/158.1 |
| 2007/0125910 A1* | 6/2007 | Cepollina | B64G 1/007 244/172.6 |
| 2007/0228219 A1* | 10/2007 | Behrens | B64G 1/1078 244/172.5 |
| 2007/0228220 A1* | 10/2007 | Behrens | B64G 1/646 244/172.5 |
| 2008/0078886 A1* | 4/2008 | Foster | B64G 1/1078 244/173.1 |
| 2008/0149776 A1* | 6/2008 | Benedict | B64G 1/641 403/321 |
| 2008/0149777 A1* | 6/2008 | Benedict | B64G 1/641 403/321 |
| 2008/0155610 A1* | 6/2008 | Rosen | H04N 7/20 725/64 |
| 2008/0237399 A1* | 10/2008 | Caplin | B64G 1/1085 244/164 |
| 2008/0265098 A1* | 10/2008 | Connelly | B64G 1/007 244/171.1 |
| 2009/0057492 A1* | 3/2009 | Harris | B64G 1/44 244/171.1 |
| 2009/0101757 A1* | 4/2009 | Brandhorst, Jr. | B64G 1/646 244/172.4 |
| 2009/0108139 A1* | 4/2009 | Duden | B64G 1/002 244/173.3 |
| 2009/0127399 A1* | 5/2009 | Mueller | B64G 1/641 244/171.1 |
| 2009/0224105 A1* | 9/2009 | Caplin | B64G 1/1085 244/164 |
| 2010/0012787 A1* | 1/2010 | Hand | B64G 1/402 428/221 |
| 2010/0176248 A1* | 7/2010 | Terziakin | B64G 1/409 244/171.3 |
| 2010/0264275 A1* | 10/2010 | Behruzi | B64G 1/402 96/178 |
| 2011/0031352 A1* | 2/2011 | Behrens | B64G 1/1078 244/172.5 |

(56) References Cited

U.S. PATENT DOCUMENTS

| | | | | |
|---|---|---|---|---|
| 2011/0097995 | A1* | 4/2011 | Caplin | H04B 7/18513 455/12.1 |
| 2011/0139936 | A1* | 6/2011 | Allen | B64G 1/40 244/158.2 |
| 2011/0210208 | A1* | 9/2011 | Ganguli | B64G 1/1078 244/113 |
| 2012/0012711 | A1* | 1/2012 | Ross | B64G 1/641 244/172.7 |
| 2012/0097796 | A1* | 4/2012 | Munir | B64G 1/007 244/158.6 |
| 2012/0097797 | A1* | 4/2012 | Woo | B64G 1/26 244/158.6 |
| 2012/0206045 | A1 | 8/2012 | Marchandise et al. | |
| 2012/0210852 | A1* | 8/2012 | McCants, Jr. | F41F 3/073 89/1.8 |
| 2012/0227374 | A1* | 9/2012 | Zegler | B64G 1/26 244/171.1 |
| 2012/0300071 | A1* | 11/2012 | Do Carmo Miranda | H04N 7/18 348/E7.085 |
| 2013/0099059 | A1* | 4/2013 | Cheynet De Beaupre | B64G 1/10 244/158.1 |
| 2013/0221162 | A1* | 8/2013 | Darooka | B64G 1/10 244/173.1 |
| 2013/0299641 | A1* | 11/2013 | Aston | B64G 1/645 244/171.1 |
| 2014/0061386 | A1* | 3/2014 | Peterka, III | B64G 1/002 244/171.1 |
| 2014/0103164 | A1* | 4/2014 | Aston | B64G 1/641 244/172.3 |
| 2014/0239125 | A1* | 8/2014 | Aston | B64G 1/641 244/172.3 |
| 2015/0001348 | A1* | 1/2015 | Aston | B64G 1/002 244/171.1 |
| 2015/0028159 | A1* | 1/2015 | Vichnin | B64G 1/002 244/173.1 |
| 2015/0210406 | A1* | 7/2015 | Yi | B64G 1/405 60/203.1 |
| 2016/0046394 | A1* | 2/2016 | Peterka, III | B64G 1/10 244/164 |
| 2016/0046397 | A1* | 2/2016 | Aston | B64G 1/40 244/173.1 |
| 2017/0297747 | A1* | 10/2017 | Peterka, III | B64G 1/002 |
| 2018/0201396 | A1* | 7/2018 | Aston | B64G 1/405 |
| 2019/0002133 | A1* | 1/2019 | Peterka, III | B64G 1/641 |
| 2020/0331638 | A1* | 10/2020 | Peterka, III | B64G 1/402 |
| 2022/0033111 | A1* | 2/2022 | Welle | B64G 1/1085 |
| 2022/0127022 | A1* | 4/2022 | Aston | B64G 1/645 |

FOREIGN PATENT DOCUMENTS

| | | |
|---|---|---|
| CN | 101381003 | 3/2009 |
| CN | 102767497 | 11/2012 |
| CN | 103448919 | 12/2013 |
| EP | 0937644 | 8/1999 |
| EP | 1013546 | 6/2000 |
| EP | 2662287 | 11/2013 |
| EP | 2662289 | 11/2013 |
| JP | S50-150200 | 12/1975 |
| JP | S6250299 | 3/1987 |
| JP | 03193597 | 8/1991 |
| JP | H6-191500 | 7/1994 |
| JP | 07-089499 | 4/1995 |
| JP | H9277997 | 10/1997 |
| JP | H11291998 | 10/1999 |
| JP | 2000168697 | 6/2000 |
| JP | 2003291898 | 10/2003 |
| JP | 2006-290065 | 10/2006 |
| JP | 2010537880 | 12/2010 |
| RU | 2040448 | 7/1995 |
| RU | 2124461 | 1/1999 |
| RU | 2233772 | 8/2004 |
| RU | 2246035 | 5/2005 |
| RU | 59749 | 12/2006 |
| RU | 2328616 | 7/2008 |
| WO | 0156883 | 8/2001 |
| WO | 2005118394 | 12/2005 |
| WO | 2009048678 | 4/2009 |

OTHER PUBLICATIONS

Japanese Patent Office, "Decision of Rejection," issued in connection with Japanese Patent Application No. 2019-000258, dated Jun. 22, 2021 (5 pages).

European Patent Office, "Communication pursuant to Article 94(3) EPC", issued in connection with European Patent Application No. 13194767.3, dated Jul. 14, 2020, (5 pages).

Japanese Patent Office, "Notice of Reasons for Rejection," issued in connection with Japanese Patent Application No. 2020-147995, dated Oct. 12, 2021 (10 pages).

European Patent Office, "Extended European Search Report," issued in connection with European Appl. No. 19185335.7, dated Nov. 17, 2021, 12 pages.

Duchemin et al., "Electric Propulsion Thruster Assembly for Small GEO-Status Update," IEPC-2011-167, Presented at the 32nd International Electric Propulsion Conference, pp. 1-9, Sep. 11-15, 2011, 9 pages.

United States Patent and Trademark Office, "Office Action," issued in connection with U.S. Appl. No. 15/920,284, dated Jun. 15, 2020, 7 pages.

Baturin, Y.M., "The Worldwide piloted Space: Science. History. Technology," RT soft, Moscow, 2005, pp. 98, 104, and 105, 4 pages.

United States Patent and Trademark Office, "Non-Final Office Action," issued in connection with U.S. Appl. No. 15/920,284, dated Aug. 20, 2020, 14 pages.

United States Patent and Trademark Office, "Final Office Action," issued in connection with U.S. Appl. No. 15/920,284, dated Dec. 18, 2020, 12 pages.

United States Patent and Trademark Office, "Advisory Action," issued in connection with U.S. Appl. No. 15/920,284, dated Feb. 25, 2021, 3 pages.

Valentian et al., "SPT sizing for integrated propulsion systems," AIAA, ASME, SAE, and ASEE, Joint Propulsion Conference and Exhibit, 32nd, Lake Buena Vista, FL, Jul. 1-3, 1996, American Institute of Aeronautics and Astronautics, Inc., 8 pages.

United States Patent and Trademark Office, "Non-final Office Action," issued in connection with U.S. Appl. No. 13/652,101, dated Apr. 11, 2014, 21 pages.

United States Patent and Trademark Office, "Notice of Allowance," issued in connection with U.S. Appl. No. 13/652,101, dated Oct. 17, 2014, 15 pages.

Spaceflight Now, "Two Broadcasting Satellites Share Proton Rocket Ride," Jul. 15, 2011, [http://www.spaceflightnow.com/proton/ses3/], retrieved on Aug. 17, 2015, 4 pages.

United States Patent and Trademark Office, "Non-Final Office Action," issued in connection with U.S. Appl. No. 13/604,050, dated Feb. 14, 2014, 14 pages.

United States Patent and Trademark Office, "Notice of Allowance," issued in connection with U.S. Appl. No. 13/604,050, dated May 20, 2014, 5 pages.

United States Patent and Trademark Office, "Non-final Office Action," issued in connection with U.S. Appl. No. 13/693,694, dated Nov. 5, 2014, 20 pages.

United States Patent and Trademark Office, "Final Office Action," issued in connection with U.S. Appl. No. 13/693,694, dated Feb. 25, 2015, 17 pages.

United States Patent and Trademark Office, "Notice of Allowance," issued in connection with U.S. Appl. No. 13/693,694, dated May 15, 2015, 28 pages.

United Kingdom Intellectual Property Office, "Combined Search and Examination Report," issued in connection with GB Patent Application No. GB1316482.7, dated Apr. 4, 2014, 4 pages.

(56) References Cited

OTHER PUBLICATIONS

European Patent Office, "European Search Report," issued in connection with European Application No. 13167339.4, dated Sep. 26, 2013, 7 pages.
Porte et al., "Benefits of Electric Propulsion for Orbit Injection of Communication Spacecraft," International Communication Sattelite Systems Conference and Exhibit, pp. 1-9, Mar. 22, 1992, 9 pages.
Maihe et al., "Design of a Hybrid Chemical/Electric Propulsion Orbital Transfer Vehicle," Journal of Spacecraft and Rockets, vol. 39, No. 1, pp. 131-139, Jan. 2002, 9 pages.
United States Patent and Trademark Office, "Non-final Office Action," issued in connection with U.S. Appl. No. 14/828,462, dated Jul. 26, 2016, 41 pages.
United States Patent and Trademark Office, "Notice of Allowance," issued in connection with U.S. Appl. No. 14/828,462, dated Jan. 11, 2017, 18 pages.
Canadian Intellectual Property Office, "Office Action," issued in connection with Canadian Patent Application No. 2,831,309, dated May 13, 2016, 3 pages.
Canadian Intellectual Property Office, "Office Action," issued in connection with Canadian Patent Application No. 2,831,309, dated Jan. 15, 2015, 4 pages.
State Intellectual Property Office of China, "Notification of Secon Office Action," issued in connection with Chinese Application No. 2013106477607, dated Jul. 12, 2017, 24 pages.
European Patent Office, "Extended European Search Report," issued in connection with EP Application No. 13194767.3, dated Nov. 24, 2017, 8 pages.
Japanese Patent Office, "Notice of Reasons for Rejection," issued in connection with JP Application No. 2013-249017, dated Dec. 5, 2017, 7 pages.
State Intellectual Property Office of China, "Notification of the Decision of Rejection," issued in connection with Chinese Application No. 2013106477607, dated Jan. 19, 2018, 20 pages.
United States Patent and Trademark Office, "Non-final Office Action," issued in connection with U.S. Appl. No. 15/477,923, dated Jun. 16, 2017, 12 pages.
United States Patent and Trademark Office, "Final Office Action," issued in connection with U.S. Appl. No. 15/477,923, dated Oct. 30, 2017, 14 pages.
United States Patent and Trademark Office, "Advisory Action," issued in connection with U.S. Appl. No. 15/477,923, dated Dec. 29, 2017, 17 pages.
United States Patent and Trademark Office, "Notice of Allowance," issued in connection with U.S. Appl. No. 15/477,923, dated Mar. 21, 2018, 7 pages.
United States Patent and Trademark Office, "Notice of Allowance," issued in connection with U.S. Appl. No. 15/477,923, dated Apr. 9, 2018, 2 pages.
United States Patent and Trademark Office, "Notice of Allowance," issued in connection with U.S. Appl. No. 15/477,923, dated Apr. 25, 2018, 6 pages.
United States Patent and Trademark Office, "Notice of Allowance," issued in connection with U.S. Appl. No. 15/477,923, dated May 10, 2018, 9 pages.
United States Patent and Trademark Office, "Notice of Allowance," issued in connection with U.S. Appl. No. 15/477,923, dated Jul. 25, 2018, 3 pages.
Japanese Patent Office, "Decision of Rejection," issued in connection with application No. 2013249017, dated Sep. 4, 2018, 7 pages.
European Patent Office, "Office Action," dated May 3, 2019, in connection with European Patent Application No. 13194767.3 (6 pages).
European Patent Office Boards of Appeal, "Summons to Oral Proceedings," issued on Nov. 30, 2018, in connection with European Patent Application No. 13167339.4 (11 pages).
State Intellectual Property Office of the People's Republic of China, "First Office Action," dated Nov. 16, 2016 in connection with Chinese Patent Application No. 2013106477607, 27 pages.

State Intellectual Property Office of the People's Republic of China, "Third Office Action," dated Jul. 26, 2019 in connection with Chinese Patent Application No. 2013106477607, 6 pages.
United States Patent and Trademark Office, "Notice of Allowance," dated Jun. 5, 2019 in connection with U.S. Appl. No. 15/477,923, 5 pages.
United States Patent and Trademark Office, "Notice of Allowance," dated Sep. 10, 2019 in connection with U.S. Appl. No. 15/477,923, 5 pages.
Japanese Patent Office, "Notice of Reasons for Rejection," issued in connection with application No. 2013-249017, dated Oct. 29, 2019, 13 pages.
Japanese Patent Office, "Notice of Reasons for Rejection," dated Feb. 25, 2020, in connection with Japanese Patent Application No. 2019-000258, 11 pages.
Stephen Clark, "Electric propulsion could launch new commercial trend," Spaceflight Now, Mar. 19, 2012 (6 pages).
D.M. Goebel M. Martinez-Lavin, T.A. Bond, A.M. King, "Performance of XIPS Electric Propulsion in On-orbit Station Keeping of the Boeing 702 Spacecraft." 38th AIAA/ASME/SAE/ASEE Joint Propulsion Conference & Exhibit, Jul. 7-10, 2002, Indianapolis, Indiana (6 pages).
Japanese Patent Office, "Notice of Reasons for Rejection," dated Mar. 3, 2020, in connection with Japanese Patent Application No. 2013-249017, 40 pages.
United States Patent and Trademark Office, "Supplemental Notice of Allowance," dated Apr. 22, 2020 in connection with U.S. Appl. No. 16/127,973, 2 pages.
United States Patent and Trademark Office, "Supplemental Notice of Allowance," dated Apr. 3, 2020 in connection with U.S. Appl. No. 16/127,973, 2 pages.
United States Patent and Trademark Office, "Notice of Allowance," dated Feb. 18, 2020 in connection with U.S. Appl. No. 16/127,973, 8 pages.
United States Patent and Trademark Office, "Non-Final Office Action," dated May 30, 2019 in connection with U.S. Appl. No. 16/127,973, 14 pages.
United States Patent and Trademark Office, "Non-Final Office Action," dated Oct. 23, 2018 in connection with U.S. Appl. No. 16/127,973, 13 pages.
United States Patent and Trademark Office, "Final Office Action," dated Nov. 25, 2019 in connection with U.S. Appl. No. 16/127,973, 15 pages.
United States Patent and Trademark Office, "Final Office Action," dated Mar. 28, 2019 in connection with U.S. Appl. No. 16/127,973, 14 pages.
Boeing 702 Fleet, Jun. 2005, retrieved from [http://www.apcon.aero/news/boeing702.pdf], 5 pages.
Clark, "Two broadcasting satellites share Proton rocket ride," web page of Spaceflight Now, Jul. 15, 2011, retrieved Mar. 16, 2018, from [http://www.spaceflightnow.com/proton/ses3/], 4 pages.
Chinese Patent Office, "Notification of First Office Action," issued in connection with Chinese Patent Application No. 201310170861.X, dated Jun. 17, 2015, 10 pages.
Chinese Patent Office, "First Office Action and Search Report," issued in connection with Chinese Patent Application No. 201610239117.4, dated Jun. 7, 2017, 19 pages.
Credland, J.; "The Cluster Mission—ESA's Space Fleet to the Magnetosphere," The Cluster Mission, ESA Bulletin No. 84, pp. 113-137, Nov. 1995, 14 pages.
European Patent Office, "Examination Report," issued in connection with European Patent Application No. 13167339.4, dated Apr. 6, 2016, 5 pages.
European Patent Office, "Communication pursuant to Article 94(3) EPC," issued in connection with European Patent Application No. 13167339.4, dated Nov. 16, 2016, 6 pages.
European Patent Office, "Communication pursuant to Rule 114(2) EPC, Third Party Observation," issued in connection with European Patent Application No. 13167339.4, on Dec. 22, 2016, 4 pages.
European Patent Office, "Brief Communication," issued in connection with European Patent Application No. 13167339.4, dated May 12, 2017, 1 page.

(56) References Cited

OTHER PUBLICATIONS

European Patent Office, "Refusal Decision," issued in connection with European Patent Application No. 13167339.4, dated Nov. 14, 2017, 35 pages.
European Patent Office, "Examination Report," issued in connection with European Patent Application No. 13167339.4, dated Sep. 1, 2015, 5 pages.
Gianolio, Alberto, "LISA—Laser Interferometer Space Antenna," EESA, Feb. 3, 2011, 8 pages.
Gibbons et al., "Packaging Multiple Small Satellites on a Single Launch Vehicle," Sep. 1989, 14 pages.
Johann et al., "The European Space Agency's LISA Mission Study: Status and Present Results," 7th Edoardo Amaldi Conference on Gravitational Waves, Journal of Physics, Conference Series 122, doi: 10.1088/1742-6596/122/1/012005, 2008, 9 pages.
Mailhe et al., "Design of a Hybrid Chemical/Electric Propulsion Orbital Transfer Vehicle," Journal of Spacecraft and Rockets, vol. 39, No. 1, Jan. 2002, pp. 131-139, 9 pages.
Mecke, G., "The Cluster Spacecraft: A unique Production Line," XP 000582980, 2531 ESA Bulletin, No. 84, Nov. 1995, pp. 118-129, 12 pages.
Merkowitz et al., "LISA Propulsion module separation study," Institute of Physics Publishing, Class. Quantum Grav. 22, doi: 10.1088/0264-9381/22/10/037; S413-S419, 2005, pp. 1-7, 7 pages.
Owano, N., "All-electric propulsion satellite by Boeing now fully operational," Tech Xplore, Sep. 2015, retrieved on Nov. 22, 2015, from [http://techxplore.com/news/2015-09-all-electric-propulsion-satellite-boeing-fully.html], 2 pages.
Fuchs, "Small Geo, A Product for the Market," 5th Capital Market Day, OHB System, Feb. 11, 2009, pp. 1-19, 19 pages.
Russian Patent Office, "Search Report," issued in connection with Russian Patent Application No. 201300451, dated Aug. 6, 2013, 3 pages.
The Cluster II Project Team, "The Cluster-II Mission-Rising from the Ashes," Cluster-II, ESA Bulletin No. 102, May 2000, pp. 47-53.
United States Patent and Trademark Office, "Notice of Allowance," issued in connection with U.S. Appl. No. 14/486,103, dated Jan. 23, 2015, 12 pages.
United States Patent and Trademark Office, "Non-Final Office Action," issued in connection with U.S. Appl. No. 14/486, 103, dated May 13, 2015, 17 pages.
United States Patent and Trademark Office, "Notice of Allowance," issued in connection with U.S. Appl. No. 14/486,103, dated Sep. 1, 2015, 9 pages.
United States Patent and Trademark Office, "Notice of Allowance," issued in connection with U.S. Appl. No. 14/486,103, dated Dec. 9, 2015, 15 pages.
United States Patent and Trademark Office, "Non-Final Office Action," issued in connection with U.S. Appl. No. 14/925,152, dated Mar. 10, 2016, 30 pages.
United States Patent and Trademark Office, "Non-Final Office Action," issued in connection with U.S. Appl. No. 14/925,152, dated Feb. 14, 2017, 15 pages.
United States Patent and Trademark Office, "Notice of Allowance," issued in connection with U.S. Appl. No. 14/925,152, dated May 31, 2017, 5 pages.
United States Patent and Trademark Office, "Supplemental Notice of Allowability," issued in connection with U.S. Appl. No. 14/925,152, dated Jun. 5, 2017, 4 pages.
United States Patent and Trademark Office, "Notice of Allowance," issued in connection with U.S. Appl. No. 14/925,152, dated Aug. 31, 2017, 5 pages.
United States Patent and Trademark Office, "Notice of Allowance," issued in connection with U.S. Appl. No. 14/925,152, dated Dec. 13, 2017, 5 pages.
United States Patent and Trademark Office, "Supplemental Notice of Allowability," issued in connection with U.S. Appl. No. 14/486,103, dated Apr. 27, 2016, 2 pages.
United States Patent and Trademark Office, "Notice of Allowance," issued in connection with U.S. Appl. No. 14/486,103, dated Mar. 21, 2016, 5 pages.
United States Patent and Trademark Office, "Notice of Allowance," issued in connection with U.S. Appl. No. 14/925,152, dated Jun. 24, 2016, 5 pages.
United States Patent and Trademark Office, "Notice of Allowance," issued in connection with U.S. Appl. No. 14/925,152, dated Oct. 24, 2016, 5 pages.
Intellectual Property Office of China, "Notification of the Decision of Rejection," issued in connection with application No. 201610239117.4, dated Jun. 4, 2018, 6 pages.
European Patent Office, "Extended European Search Report," issued in connection with patent application No. 19185335.7 dated Nov. 12, 2019, 10 pages.
European Patent Office, "Communication pursuant to Article 94(3) EPC", issued in connection with European Patent Application No. 13194767.3, dated Mar. 17, 2021, (6 pages).
United States Patent and Trademark Office, "Notice of Allowance", issued in connection with U.S. Appl. No. 15/920,284, dated Mar. 31, 2021, (21 pages).
United States Patent and Trademark Office, "Supplemental Notice of Allowance," issued in connection with U.S. Appl. No. 15/920,284, dated Apr. 7, 2021, 10 pages.
Reshetnev Company, "Communications on a global scale, Information Satellite Systems, Journal—Oct. 2010", 2010 (32 pages).
Reshetnev Company, "JSC ISS Corporate Presentation," Apr. 22-23, 2010 (30 pages).
Gilles, "AMOS 5 et Loutch 5A lances avec succes par Proton M Breeze M", Dec. 14, 2011, article extracted from the Internet site of Association amicale des anciens de l'activite spatiale' with English translation, 4AS Alcatel Alenia Thales, available online: http://4aspace.online.fr/spip/imprimer.php?id_article=364 (2 pages).
Gilles, "AMOS 5 et Loutch 5A lances avec succes par Proton M Breeze M", Dec. 14, 2011, enlarged photo extracted from the Internet site of 'Association amicale des anciens de l'activite spatiale' 4AS Alcatel Alenia Thales, available online: http://4aspace.online.fr/spip/imprimer.php?id_article=364 (1 page).
Justin Ray, "Two satellites share one rocket launch into orbit," SpaceFlight Now, Dec. 11, 2011; available online: https://spaceflightnow.com/proton/amos5luch5a/ (3 pages).
Luch Satellite, extract from the Internet site www.russianspaceweb.com, Dec. 10, 2011, available online: http://www.russianspaceweb.com/1uch5a html (6 pages).
Reshetnev Company, "50 years on Earth and space, Information Satellite Systems," Journal No. 8, 2009, 2009 (32 pages).
"Proton Launch System Mission Planner's Guide, Section 4, Space Vehicle Interfaces", Jul. 2009 (38 pages).
Raumfahrer, "Luch 5A und AMOS 5 auf Proton M Bris-M, forum, www.raumfahrer.net", Nov. 30, 2011, available online: https://www.raumfahrer.net/forum/smf/index.php?topic=9864.0 (20 pages).
W. M. Folkner et al., "LISA: Mission Concept Study. Laser interferometer Space Antenna For the Detection and Observation of Gravitational Waves," JPL publication 97-16, Mar. 2, 1998 (91 pages).
Rudy Lukez, "The use of graphite/epoxy composite structures in space applications" Morton Thiokol, Inc., Aerospace Group Brigham City, Utah, 1987 (11 pages).
Digital Commons, "Small Satellite Conference" All 1978 Contents Schedule, 1987, last retrieved Jan. 27, 2021, available online: https://digitalcommons.usu.edu/smallsat/1987/alli 987/ (6 pages).
"Wikipedia, Polymere renforce de fibres de carbones" version of Feb. 7, 2012, available online: https://fr.wikipedia.org/w/index.php?title=Polym%C3%A&re renforc%C3%A9 de fibres de carbone &oldid=75262512 (6 pages).
Chuck Lazansky, "Refinement of a Low-Shock Separation System," Proceedings of the 41st Aerospace Mechanism Symposium (AMS), Jet Propulsion Laboratory, May 16-18, 2012, proceedings made available to the public on Jun. 6, 2012 (15 pages).
Nasa Jet propulsion Laboratory—California institute of technology—Beacon Library, archive and records : proof of date of availability to the public of the proceedings of 41st AMS download page of (56) References Cited

OTHER PUBLICATIONS these proceedings avialable online: https://trs.jpl.nasa.gov/handle/2014/42161?show=full (3 pages).

Wikipedia, "Marman Clamp", Apr. 14, 2012, available online: https://en.wikipedia.org/w/index.php?title=Marman_clamp&direction=prev&oldid=492029464 (1 page).

LISA, "Laser interferometer Space Antenna: A Cornerstone Mission for the Observation of Gravitational Waves," System and Technology Study Report, Jul. 2000 (342 pages).

NASA Spaceflight Forums, "Proton-M Launch with Lunch-5A and AMOS-5," Dec. 11, 2011, available online: forum.nasaspaceflight.com/index.php?topic=27248.060 (14 pages).

European Patent Office, "Opposition," issued in connection with European Patent Application No. 2662287, dated Jan. 28, 2021 (72 pages).

Japanese Patent and Trademark Office, "Notice of Reasons for Rejection", issued in connection with JP Patent Application No. 2019-000258, dated Sep. 29, 2020, (11 pages).

United States Patent and Trademark Office, "Supplemental Notice of Allowability," issued in connection with U.S. Appl. No. 15/920,284, dated Feb. 3, 2022, 2 pages.

United States Patent and Trademark Office, "Notice of Allowance," issued in connection with U.S. Appl. No. 15/920,284, dated Jul. 12, 2021, 5 pages.

Japan Patent Office: "Decision of Rejection" mailed in connection with corresponding Japanese Patent Application No. 2020-147995 dated Mar. 15, 2022 (6 pages). English version included.

Japan Patent Office: "Notice of Reasons for Rejection" issued in connection with corresponding Japanese Patent Application No. 2019-000258 dated Jul. 19, 2022 (22 pages). English version included.

State Intellectual Property Office of China, "Second Office Action", issued in connection with Chinese Patent Application No. 2018104861031, dated Sep. 17, 2021, (15 pages). English version included.

United States Patent and Trademark Office, "Non-Final Office Action," issued in connection with U.S. Appl. No. 16/903,017, dated Jan. 17, 2023, 8 pages.

United States Patent and Trademark Office, "Notice of Allowance," issued in connection with U.S. Appl. No. 16/903,017, dated Mar. 3, 2023, 9 pages.

United States Patent and Trademark Office, "Supplemental Notice of Allowability," issued in connection with U.S. Appl. No. 16/903,017, dated Apr. 26, 2023, 2 pages.

Japan Patent Office: "Notice of Reasons for Refusal" mailed in connection with corresponding Japanese Patent Application No. 2020-147995 dated Jun. 20, 2023 (49 pages). English version included.

State Intellectual Property Office of China, "Notification to Grant Patent Right for Invention", issued in connection with Chinese Patent Application No. 2018104861031, dated Jan. 26, 2022, (3 pages). English version included.

\* cited by examiner

MULTIPLE SPACE VEHICLE LAUNCH SYSTEM

RELATED APPLICATIONS

This application claims the benefit of U.S. application Ser. No. 15/920,284, filed on Mar. 13, 2018, which claims the benefit of U.S. application Ser. No. 14/925,152, filed on Oct. 28, 2015, which claims the benefit of U.S. application Ser. No. 14/486,103, filed on Sep. 15, 2014, which claims the benefit of U.S. application Ser. No. 13/604,050, filed on Sep. 5, 2012, which claims the benefit of U.S. Provisional Application No. 61/646,222, filed on May 11, 2012. U.S. patent application Ser. No. 15/920,284, U.S. patent application Ser. No. 14/925,152, U.S. patent application Ser. No. 14/486,103, U.S. patent application Ser. No. 13/604,050, and U.S. Provisional Application No. 61/646,222 are hereby incorporated by reference in their entireties. Priority to U.S. patent application Ser. No. 15/920,284, U.S. patent application Ser. No. 14/925,152, U.S. patent application Ser. No. 14/486,103, U.S. patent application Ser. No. 13/604,050, and U.S. Provisional Application No. 61/646,222 is hereby claimed.

BACKGROUND

The present disclosure is directed to space vehicle launch systems and, more particularly, to space vehicle launch systems for launching multiple payloads.

Typical launch vehicles are very expensive. Further, each kilogram of payload that is to be launched into Earth orbit may require as much as ten kilograms of fuel. Accordingly, it may be desirable to minimize payload mass in order to reduce overall cost and fuel requirements. One mechanism for reducing payload mass may be to eliminate any unnecessary structure from the payload.

As a result of such cost concerns, it may be desirable to launch two or more discrete payloads with a single launch vehicle. Such multiple payloads may be in the form of space vehicles, such as satellites. Typically, such satellites themselves may require and incorporate chemical rocket motors to increase orbital altitude and to make altitude adjustments once the desired orbital altitude is achieved.

Such chemically powered space vehicles are relatively heavy. Due to space constraints within the payload region of the fairing, it is often necessary to orient such space vehicles in a linear or stacked column that may extend along a central longitudinal axis of the launch vehicle. When such a launch vehicle is on a launch pad, and after lift-off, the orientation of such space vehicles is substantially vertical.

As a result, the weight, or gravitational force of the mass, of an upper space vehicle may bear down upon a lower space vehicle in such a vertical configuration. When the launch vehicle lifts off the launch pad, this gravitational force is multiplied as a result of the acceleration of the launch vehicle into Earth orbit. Because of the mass of the space vehicles, especially if equipped with chemical rocket motors, the lower space vehicle may not be able to withstand the gravitational force and launch load of the upper space vehicle. Accordingly, a support structure is required.

One example of such support structure is a dual-launch structure denoted in French as Systeme de Lancement Double Ariane (Sylda), or in English this is known as a Double Ariane Launch System, as employed on the Ariane 4 and Ariane 5 rockets. A Sylda may be made of carbon fiber and be in the form of a hollow structure that encloses the lower space vehicle and engages and supports the upper space vehicle. Gravitational forces and launch loads may be transmitted from the upper space vehicle, to the Sylda, and from the Sylda to the support base of the fairing. Thus, the lower space vehicle does not have to support the mass and launch load of the upper space vehicle.

A disadvantage of such an arrangement may be that the use of a Sylda adds to the overall payload mass, which may increase the fuel requirement and/or reduce the available size of a payload that is to be launched into orbit by a given launch vehicle. Accordingly, there is a need for a multiple space vehicle launch system that minimizes or eliminates the need for such support structure.

SUMMARY

The present disclosure is directed to a multiple space vehicle launch system that may include a first space vehicle, and a second space vehicle releasably attached to the first space vehicle and oriented relative to the first space vehicle such that, when placed within a fairing, a launch load from the first space vehicle is transmitted to and borne by the second space vehicle, thereby eliminating the need for Sylda or other reinforcing or support structure. In an embodiment, the first and second space vehicles each may include one of an electrical propulsion motor and a hybrid chemical and electrical propulsion motor. By utilizing electrical propulsion motors in the space vehicles, the total mass of the space vehicle may be significantly reduced when compared to a space vehicle having a chemical propulsion motor, which may enable support structures such as Sylda to be eliminated.

According to an embodiment, a method of manufacturing a space vehicle system is disclosed. The method comprises disposing a first space vehicle having an upper core structure upon a second space vehicle having a lower core structure such that loads of the first space vehicle may be transmitted to the lower core structure of the second space vehicle.

In another embodiment, a method of assembling a space vehicle system is disclosed. The method comprises disposing a first space vehicle having an upper core structure upon a second space vehicle having a lower core structure such that loads of the first space vehicle may be transmitted to the lower core structure of the second space vehicle. The method further comprises disposing the first space vehicle and the second space vehicle into a payload region of a launch vehicle.

In yet another embodiment, a space vehicle system is disclosed. The space vehicle system may include a first space vehicle having an upper core structure and a second space vehicle having a lower core structure. The first space vehicle is disposed upon the second space vehicle such that loads of the first space vehicle may be transmitted to the lower core structure of the second space vehicle.

In another embodiment, a method of launching a space vehicle system is disclosed. The space vehicle system may include a first space vehicle having an upper core structure disposed upon a second space vehicle having a lower core structure. The method comprises causing loads associated with the first space vehicle to be transmitted to and borne by the lower core structure of the second space vehicle. The method further comprises launching the first space vehicle and the second space vehicle.

In yet another embodiment, a space vehicle system is disclosed. The space vehicle system may include a first space vehicle having an upper core structure and a second space vehicle having a lower core structure. The first space vehicle is disposed upon the second space vehicle prior to deployment of the space vehicle system such that loads of the first space vehicle may be transmitted to the lower core structure of the second space vehicle. The first space vehicle and the second space vehicle may be separated from one another during the deployment of the space vehicle system.

In the embodiments described above and others, the use of traditional inter-launch vehicle fairing, Sylda, and interfairing separation systems may be eliminated. This reduces the non-revenue generating payload mass and may reserve more available mass for revenue generating payload. Other objects and advantages will be apparent from the following description, the accompanying drawings and the appended claims.

DETAILED DESCRIPTION

Figure 1:
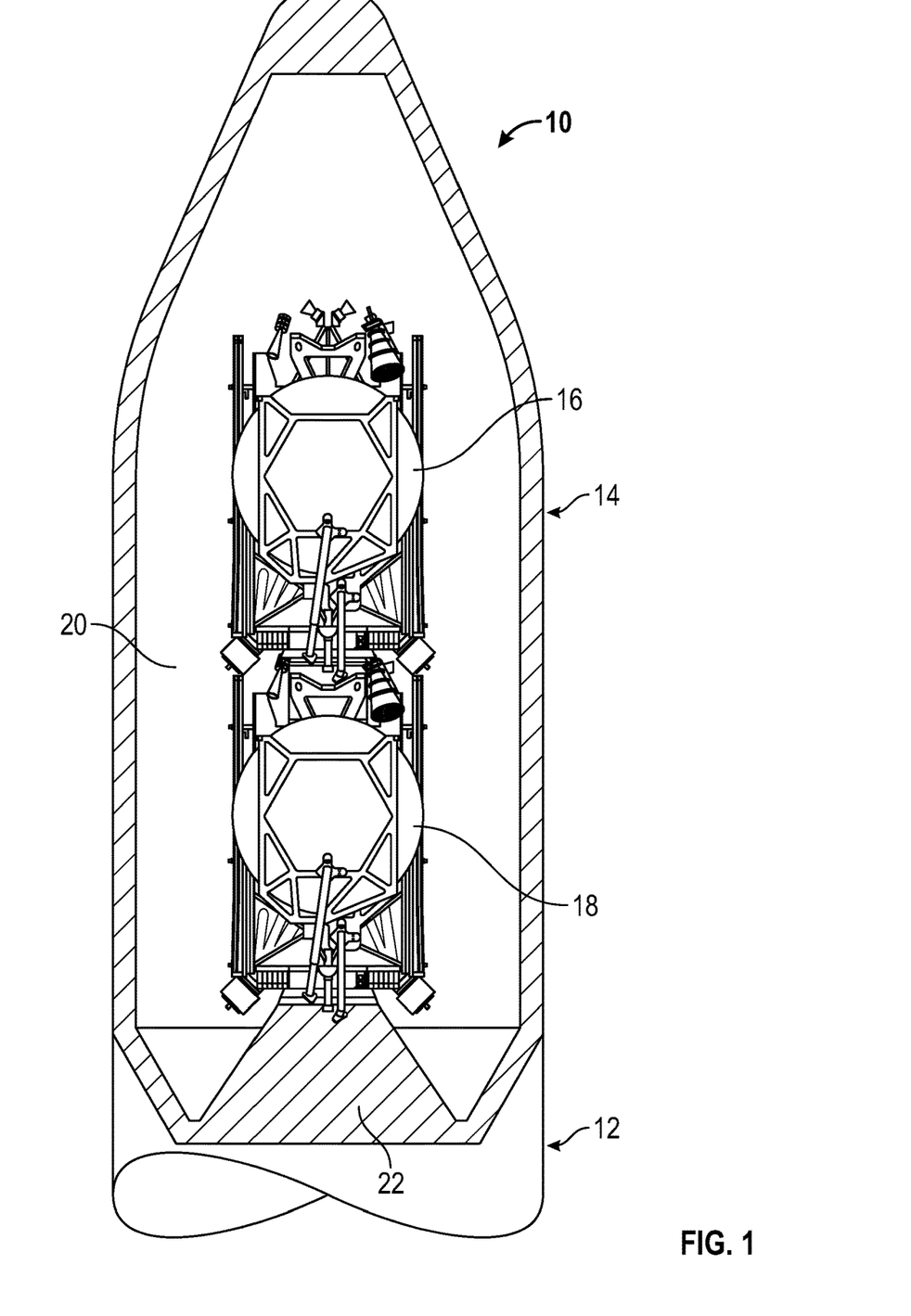
FIG. 1 is a schematic, side elevation in section of an embodiment of the multiple space vehicle launch system of the present disclosure.

As shown in FIG. 1, the multiple space vehicle launch system, generally designated 10, is used with a launch vehicle 12 having a fairing 14. The system 10 may include a first or upper space vehicle, generally designated 16, and a second or lower space vehicle, generally designated 18. The space vehicles are positioned within a payload region 20 of the fairing 14. It should be noted that, although FIG. 1 shows a space vehicle launch system 10 having two space vehicles 16, 18, it is within the scope of the disclosure to provide a space vehicle launch system having three or more space vehicles.

Regardless of the number of space vehicles 16, 18 employed in the launch system, the arrangement of space vehicles within the fairing 14 may be in a stacked, vertical configuration as shown in FIG. 1. The term "vertical" as used herein refers to the orientation of the stacked space vehicles 16, 18 relative to a launch pad (not shown) supporting the launch vehicle 12 when the launch vehicle is oriented in a vertical position, or a vertically stacked manner, relative to the Earth. In an embodiment, the stacked space vehicles 16, 18 may be aligned with, and may coincide with, a central longitudinal axis of the fairing 14 and/or launch vehicle 12. The lower space vehicle 18 may rest upon a base 22 that may be a part of the fairing 14.

Figure 2:
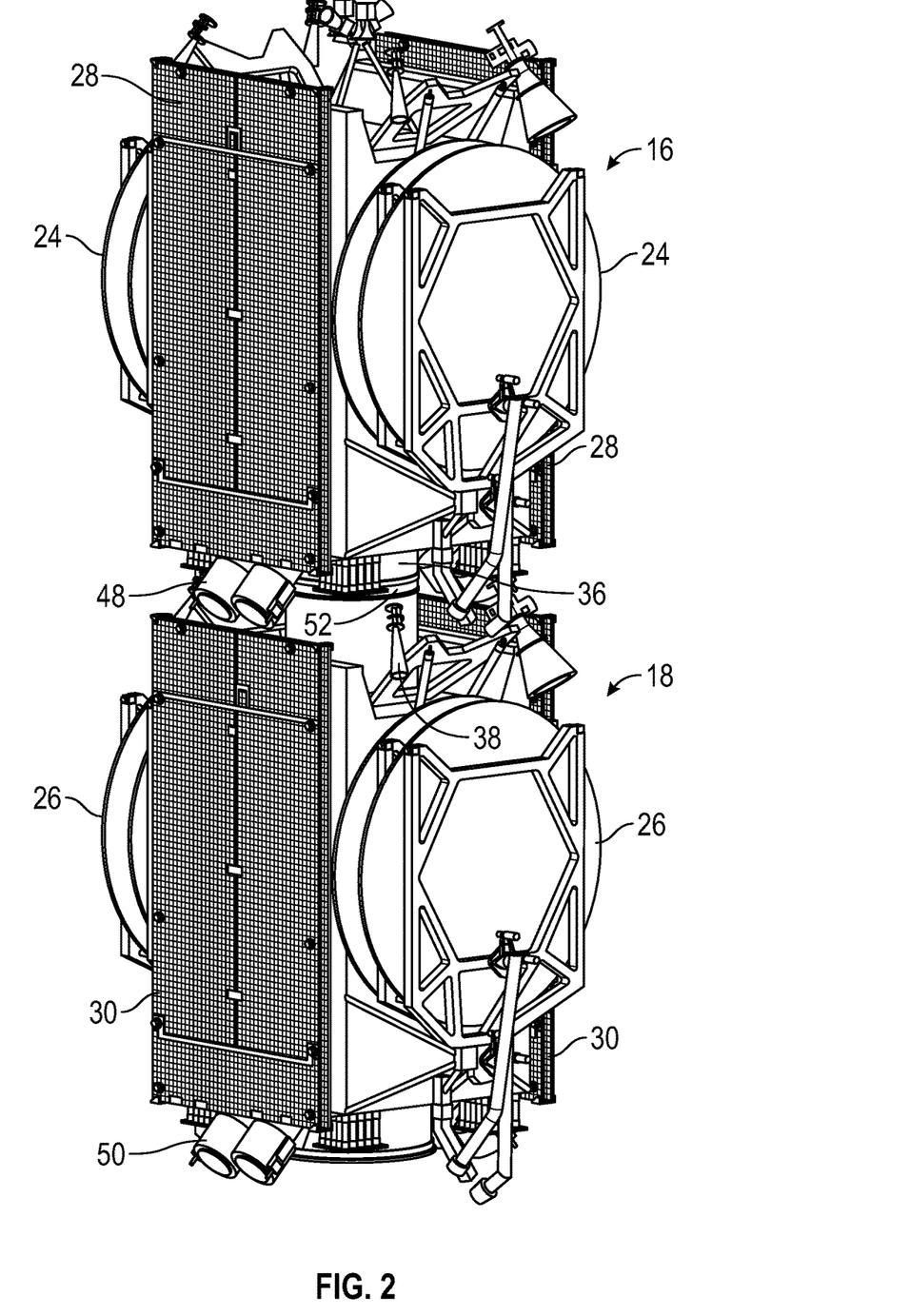
FIG. 2 is a schematic, perspective view of two space vehicles depicted in FIG. 1.
Figure 3:
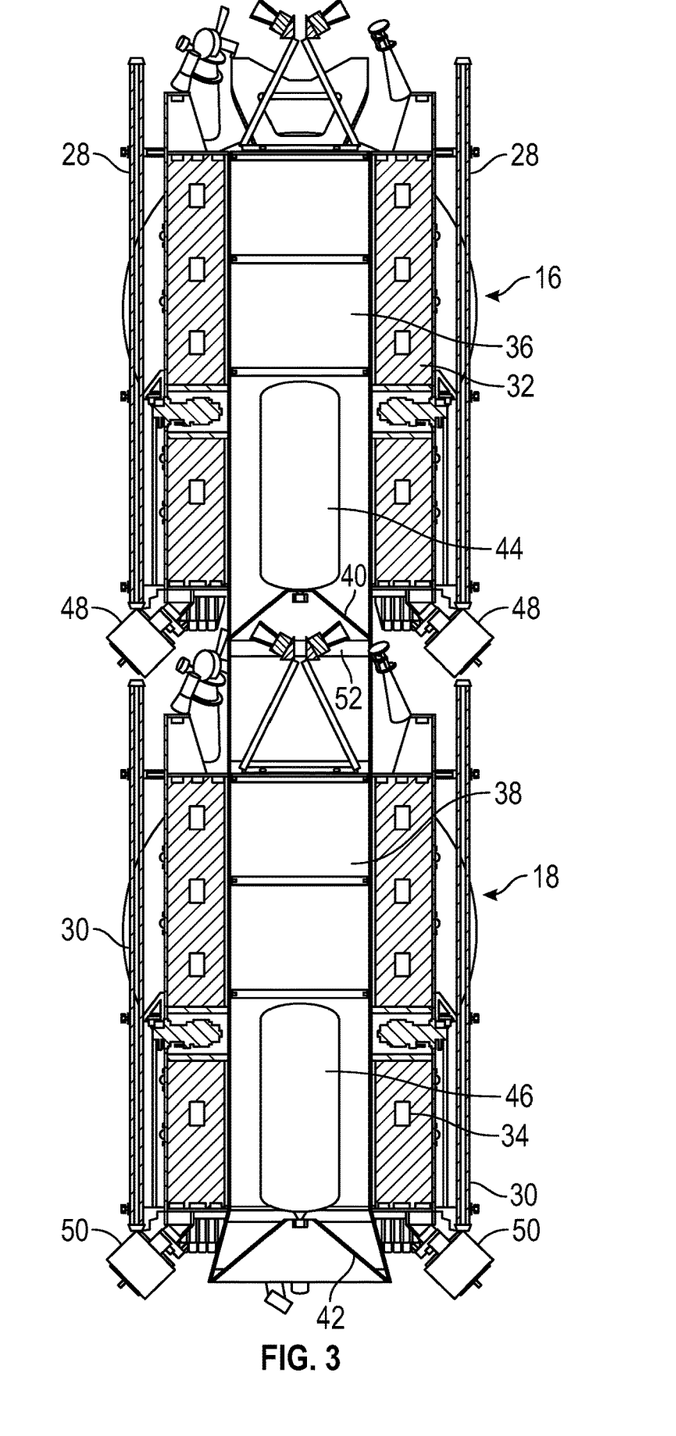
FIG. 3 is a schematic, side elevation in section of the space vehicles depicted in FIG. 1.

As shown in FIGS. 2 and 3, the space vehicles 16, 18 may be satellites. In various embodiments, the space vehicles 16, 18 may be geosynchronous satellites, interplanetary probes, combinations thereof, or any type of space vehicle having a propulsion system that is launched by a launch vehicle 12 (FIG. 1).

The space vehicles 16, 18 may include antenna reflectors 24, 26, respectively, and deployable solar arrays 28, 30, respectively. As best shown in FIG. 3, the space vehicles 16, 18 may include shear load panels 32, 34 that are mounted on core structures 36, 38, respectively.

The core structures 36, 38 may be cylindrical in shape and hollow. Core structures may be of other shapes and not depart from the scope of this disclosure. Core structure 36 may be made of a strong, light material such as graphite, and in one embodiment have a wall thickness of 0.09". Core structure 38 also may be made of a strong, light material such as graphite, and in one embodiment have a wall thickness of 0.45". The shear panels 32, 34 may support the solar arrays 28, 30 of the space vehicles 16, 18, respectively.

In the embodiment shown in FIGS. 2 and 3, the space vehicles 16, 18 each may include an electric propulsion unit such as an electric propulsion motor, generally designated 40, 42, respectively. Electric propulsion motors 40, 42 may consist of an ion/plasma motor that utilizes Xenon gas as a propellant that is stored in tanks 44, 46 that may be positioned within core structures 36, 38, respectively. The electric propulsion motors 40, 42 also may include exhaust nozzles 48, 50, respectively.

In the embodiment shown in FIGS. 2 and 3, the space vehicles 16, 18 each may include a single electric propulsion motor 40, 42 that may constitute the sole source of propulsion and navigation for that space vehicle; no other propulsion source may be included. The components 40, 42 of space vehicles 16, 18 also may represent other types of electric propulsion motors, as well as hybrid electric/chemical propulsion units such as hybrid electric/chemical propulsion motors. It is also within the scope of the disclosure to provide space vehicle 16 with an electric propulsion motor 40 and provide space vehicle 18 with a hybrid electric/chemical propulsion motor 42. Use of electric propulsion motors 40, 42, or hybrid electric/chemical propulsion motors may be advantageous because they reduce the overall mass of the space vehicles 16, 18 in comparison to chemical propulsion motors.

In one embodiment, the upper space vehicle 16 may be connected to the lower space vehicle 18 by a pre-tensioned release band 52 that connects the core structure 36 of the upper vehicle with the core structure 38 of the lower vehicle. As shown in the figures, the core structure 38 of the lower vehicle 18 may extend upwardly above the upper edge of the solar arrays 30 of the lower vehicle to engage the core structure 36 which, in the embodiment shown, may not extend beyond the lower edge of the solar arrays 28 of the upper space vehicle.

In operation, the upper and lower space vehicles 16, 18, respectively, first may be attached to each other by the pre-tensioned release band 52. The combined space vehicles 16, 18 may be placed within the fairing 14 of a launch vehicle 12, as shown in FIG. 1, so that the lower space vehicle rests upon the base 22 of the fairing.

When the launch vehicle is standing on the launch pad (not shown), the launch vehicle 12, fairing 14 and space vehicles 16, 18 may be oriented vertically relative to the Earth. In this configuration, the downward gravitational force of the upper space vehicle 16 may be transmitted to and borne entirely by the lower space vehicle 18. In the embodiment shown, this gravitational force may be transmitted entirely from the core structure 36 of the upper space vehicle 16 to the core structure 38 of the lower space vehicle 18.

During liftoff of the launch vehicle 12, the acceleration forces of the upper space vehicle 16 likewise may be transmitted through the core structure 36 to the core structure 38 of the lower space vehicle 18. In the embodiment shown, the upper and lower space vehicles 16, 18 may be linearly and vertically aligned in a vertically stacked configuration so that the gravitational and launch loads of the upper space vehicle 16 are efficiently transmitted to and borne entirely by the lower space vehicle 18.

In conclusion, two configuration features of the disclosed space vehicle launch system combine to provide a reduction in overall launch system mass. First, the individual space vehicles do not use conventional chemical propellant, but instead use electric propulsion, in one embodiment, which has a higher efficiency and thus requires significantly less propellant mass. In another embodiment, the space vehicles may use a hybrid electric/chemical propulsion motor. Second, the space vehicles may be stacked, one on top of the other, so that the launch loads from the upper space vehicle may pass through the lower space vehicle.

The upper and lower space vehicles may include a compatible mounting structure for releasably mounting adjacent spacecraft. This structure may eliminate the need for an inner fairing structure or a fairing separation system, which otherwise might be necessary for multiple manifested spacecraft. The disclosed vehicle launch system may eliminate a significant amount of mass that is not required to fulfill the primary spacecraft mission, which allows more available mass for revenue-generating payload. Further, minimizing propellant mass and non-functional structure mass from the launch vehicle optimizes the overall system mass.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A space vehicle system, comprising:
    a first space vehicle including a first core structure with a first wall thickness;
    a second space vehicle including:
        a second core structure with a second wall thickness, the second core structure releasably attached to the first space vehicle in a stacked configuration, the second wall thickness greater than the first wall thickness such that a launch load of the first space vehicle is transferred to the second space vehicle;
        a tank to store propellant for a propulsion unit; and
        a shear load panel coupled to and at least partially surrounding the second core structure, the shear load panel extending along a longitudinal axis of the second space vehicle, wherein the tank extends past an end of the shear load panel along the longitudinal axis, the shear load panel to support a solar array.

2. The space vehicle system of claim 1, wherein the stacked configuration is a configuration such that the launch load from the first space vehicle is provided to the second space vehicle through the first core structure and the second core structure.

3. The space vehicle system of claim 2, wherein the launch load is provided entirely from the first space vehicle to the second space vehicle.

4. The space vehicle system of claim 1, wherein at least one of the first core structure or the second core structure is hollow.

5. The space vehicle system of claim 1, wherein at least one of a first portion of the first core structure or a second portion of the second core structure is made of graphite.

6. The space vehicle system of claim 1, wherein the first core structure is coupled to the second core structure with a pre-tensioned release band.

7. The space vehicle system of claim 1, wherein the first core structure extends beyond a lower edge of the solar array.

8. The space vehicle system of claim 1, wherein the second core structure extends beyond an upper edge of the solar array.

9. The space vehicle system of claim 1, wherein the first space vehicle includes a first electric propulsion system including a first electric propulsion motor and the second space vehicle includes a second electric propulsion system including a second electric propulsion motor, the first electric propulsion motor to constitute the sole source of propulsion for the first space vehicle and the second electric propulsion motor to constitute the sole source of propulsion for the second space vehicle.

10. The space vehicle system of claim 1, wherein the propulsion unit is a first propulsion unit, the tank is a first tank, and the propellant is first propellant, and wherein the first space vehicle includes a second propulsion unit and a second tank to store second propellant for the second propulsion unit.

11. A method of manufacturing a multiple space vehicle system, the method comprising:
    coupling a first core structure of a first space vehicle to a second core structure of a second space vehicle along a longitudinal axis of a launch vehicle using one or more release bands, the second space vehicle including a tank to store propellant for a propulsion unit, the first core structure having a first wall thickness and the second core structure having a second wall thickness, the second wall thickness greater than the first wall thickness such that a launch load of the first space vehicle is transferred to the second space vehicle;
    mounting a shear load panel to the second core structure, the shear load panel extending along the longitudinal axis, wherein the tank extends past an end of the shear load panel along the longitudinal axis, the shear load panel to at least partially surround the second core structure, the shear load panel to support a solar array; and
    disposing the first core structure and the second core structure in a fairing of the launch vehicle such that the second core structure is coupled to the launch vehicle.

12. The method of claim 11, further including:
    mounting the solar array to the shear load panel, the second core structure extending upwardly above an upper edge of the solar array to engage the first core structure.

13. The method of claim 11, wherein the disposing of the first core structure and the second core structure includes orienting the first core structure and the second core structure in a stacked configuration within a payload region of the fairing.

14. The method of claim 13, wherein the stacked configuration is a vertically stacked configuration, the launch load of the first space vehicle is transmitted to and borne by the second space vehicle by orienting the first core structure and the second core structure in the vertically stacked configuration.

15. A method of disposing space vehicles into Earth orbit, the method comprising:
    initiating a liftoff of a launch vehicle, the launch vehicle including:
        a first space vehicle including a first core structure having a first wall thickness;
        a second space vehicle attached to the first space vehicle in a stacked configuration, the second space vehicle including:
            a second core structure having a second wall thickness, the second wall thickness greater than the first wall thickness such that a launch load of the first space vehicle is transferred to the second space vehicle, the first space vehicle and the second space vehicle disposed upon a base of a fairing of the launch vehicle;

a tank to store propellant for a propulsion unit; and a shear load panel coupled to and at least partially surrounding the second core structure, the shear load panel extending along a longitudinal axis of the second space vehicle, wherein the tank extends past an end of the shear load panel along the longitudinal axis, the shear load panel to support a solar array; and after the initiating of the liftoff of the launch vehicle, separating the first space vehicle from the second space vehicle to cause the first space vehicle and the second space vehicle to launch into Earth orbit.

16. The method of claim 15, further including, in response to initiating the liftoff of the launch vehicle, transmitting the launch load of the first space vehicle to the second space vehicle.

17. The method of claim 16, wherein the solar array is a first solar array, and wherein the first space vehicle includes the first solar array and the second space vehicle includes a second solar array, and, in response to the separating of the first space vehicle from the second space vehicle, deploying at least one of the first solar array or the second solar array from a first position to a second position.

18. The space vehicle system of claim 1, wherein the shear load panel includes a flat outer surface to support the solar array.

19. The space vehicle system of claim 18, wherein the flat outer surface is a first flat outer surface, and wherein the shear load panel includes a second flat outer surface on a first side opposite a second side of the first flat outer surface.

20. The space vehicle system of claim 18, wherein the flat outer surface includes a rectangular perimeter.

21. The space vehicle system of claim 19, wherein the shear load panel includes a third flat outer surface extending between the first flat outer surface and the second flat outer surface.

22. The space vehicle system of claim 1, wherein the shear load panel is a first shear load panel surrounding the second core structure, and further including a second shear load panel surrounding the first core structure.

23. The space vehicle system of claim 22, further including a pre-tensioned release band positioned between the first shear load panel and the second shear load panel.

24. The space vehicle system of claim 1, wherein the second wall thickness is more than twice the first wall thickness.

25. The space vehicle system of claim 1, further including a fairing, the fairing including:

a first wall to laterally surround the first and second space vehicles, the first wall extending along the longitudinal axis;

a second wall positioned at a first angle relative to the first wall;

a base to support the second core structure of the second space vehicle, a first end of the base to contact the second core structure, a second end of the base to contact the second wall of the fairing; and a third wall extending from the second wall to the first wall, the third wall positioned at a second angle relative to the first wall, the second angle different from the first angle.

26. The space vehicle system of claim 25, wherein an exterior surface of the base tapers in a direction from the second end to the first end.

27. The space vehicle system of claim 1, wherein the shear load panel is a first shear load panel, and further including a second shear load panel surrounding the second core structure, the second shear load panel spaced apart from the first shear load panel, the solar array to traverse the first and second shear load panels along the longitudinal axis.

28. The space vehicle system of claim 27, wherein the tank extends from a first end of the first shear load panel to a second end of the second shear load panel.

29. The space vehicle system of claim 1, wherein the shear load panel has a first longitudinal length and the tank has a second longitudinal length greater than the first longitudinal length.

* * * * *